United States Patent [19]
Velzel et al.

[11] Patent Number: 5,995,227
[45] Date of Patent: *Nov. 30, 1999

[54] METHOD AND INTERFERENCE MICROSCOPE FOR MICROSCOPING AN OBJECT IN ORDER TO OBTAIN A RESOLUTION BEYOND THE DIFFRACTION LIMIT (HIGH RESOLUTION)

[76] Inventors: Christiaan H. F. Velzel, Floralaan Oost 92, JC Eindhoven, NL-5643, Netherlands; Robert Masselink, Beekengrund 8, Weyhe-Leeste, D-28844, Germany; Hans Hermann Schreier, August-Wegmann-Str. 7, Oldenburg, D-26131, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/793,218
[22] PCT Filed: Aug. 16, 1995
[86] PCT No.: PCT/DE95/01073
  § 371 Date: Feb. 19, 1997
  § 102(e) Date: Feb. 19, 1997
[87] PCT Pub. No.: WO96/06324
  PCT Pub. Date: Feb. 29, 1996

[30] Foreign Application Priority Data

Aug. 19, 1994 [DE] Germany .............................. 44 29 416

[51] Int. Cl.⁶ ..................................................... G01B 9/02
[52] U.S. Cl. ........................... 356/360; 356/345; 356/359
[58] Field of Search ................................... 356/345, 359, 356/360

[56] References Cited

U.S. PATENT DOCUMENTS 5,402,234  3/1995  Deck ........................................ 356/360

OTHER PUBLICATIONS

Phase–Measurement Interferometry Techniques by Katherine Creath, 1988, E. Wolf, Progress in Optics.
On Superresolution of Phase Objects by V.P. Tychinsky Dec. 1989, Optics Communications.
Optics Communications, Bd. 74, Nr. 1/2, Dec. 1, 1989, pp. 37–40.

*Primary Examiner*—Robert H. Kim
*Attorney, Agent, or Firm*—Collard & Roe, P.C.

[57] ABSTRACT

The invention relates to a method for microscoping an object with a (phase-measurement) interference microscope with extremely high resolution, in which the light beam of a light source is divided into at least two coherent part beams, of which at least one serves for illuminating the object, and whereby the part beams are interferingly combined again and supplied to an interference figure detector screened into image zones, for achieving a resolution beyond the diffraction limit. Furthermore, the invention relates to an interference microscope, preferably for carrying out the above method. The method according to the invention is characterized in that by means of a zooming system with adjustable enlargement, said system being connected upstream of the interference figure detector, an enlargement is adjusted by which the location uncertainty to be determined is allocated to a part zone of an image zone of the detector screen by using for the zoom adjustment through a feedback the image information of the interference figure detector of at least one preceding picture recording on the basis of a phase image computed therefrom.

13 Claims, 3 Drawing Sheets

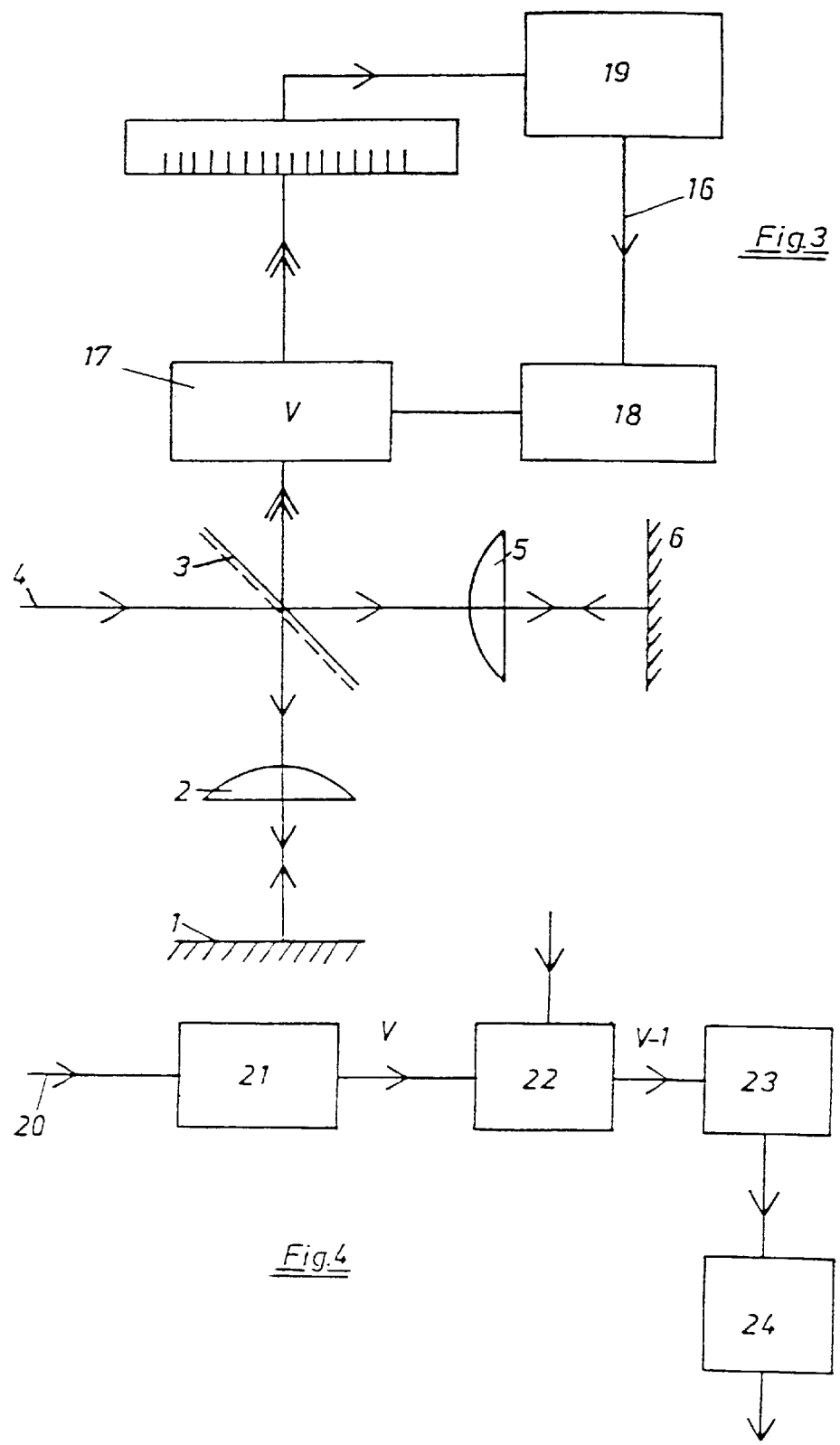

METHOD AND INTERFERENCE MICROSCOPE FOR MICROSCOPING AN OBJECT IN ORDER TO OBTAIN A RESOLUTION BEYOND THE DIFFRACTION LIMIT (HIGH RESOLUTION)

BACKGROUND OF THE INVENTION

1. Field of the Invention

The invention relates to a method of microscoping an object with an interference microscope with extremely high resolution, by which method the object is illuminated through a lens by means of a light source, whereby the light beam of the light source is divided by a beam divider into at least two coherent part beams, of which at least one serves for illuminating the object, and the part beams, following illumination of the object and, if need be, of a reference object, are interferingly combined again and supplied to an interference figure detector screened in figure zones, for producing at least one interference figure, and based on the figure information of one or a plurality of interference figure(s), a phase image is calculated by means of a suitable algorithm, for obtaining a resolution beyond the diffraction limit, i.e., a location uncertainty $\Delta x$ to be determined on the object smaller than one half wavelength of the light used.

Furthermore, the invention relates to an interference microscope, for example of the Linnik-type, with a light source for illuminating an object; with a beam divider for dividing the light beam emitted by the light source into at least two coherent part beams, of which at least one is intended for illuminating the object; and with an interference figure detector screened in figure zones, for example a pixeled CCD-line, for generating an interference figure of the interfering part beams, preferably for carrying out the aforementioned method.

2. The Prior Art

Techniques of phase-measurement interference microscopy are known, for example from the report by Catherine Creath "Phase-Measurement Interferometry Techniques", published in E. Wolf, Progress in Optics XXVI, Amsterdam 1988, pp 350–393.

In an interference microscope, it is generally possible to convert the intensity pattern—which is formed in the plane of the image by interference of the object wave and a coherent reference wave—into a phase image, namely by scanning or recording the image through a screened interference figure detector, and by further processing the obtained image or a number of images by a software algorithm. Various algorithms and their advantages or merits are reviewed in the report cited above.

Especially the four-step procedure, the so-called four-bucket-method addressed in the above-cited report in chapter 3.4, plays a role for the present invention, said method being explained in the following as background knowledge. This is done in view of the fact that according to the type of microscopy specified above, the objective is to achieve through interference microscopy a resolution beyond the diffraction limit, i.e., of a location uncertainty to be determined smaller than half the wavelength of the light used, a so-called super resolution.

The so-called four-bucket algorithm uses four intensity images in order to obtain a phase image. The intensity in a (two-beam) interference pattern can be described by:

$$I(x,y)=a^2(x,y)(1+\mu(x,y)\cos\phi(x,y), \quad (1)$$

whereby $a(x,y)$ is the real amplitude, $\mu(x,y)$ is the band contrast (modulation depth), and $\phi(x,y)$ is the phase image to be obtained. This intensity distribution is scanned by the detector. For pixels (i,j) of a CCD-detector, the following is obtained thereby:

$$I(i,j)=a^2(i,j)(1+\mu(i,j)\cos\phi(i,j)). \quad (2)$$

Various types of microscopes can be used in this connection as interference microscopes, for example Mirau, Nomarski, etc. However, a microscope of the Linnik-type is preferred. Such microscopes are described, for example in H. Beyer and H. Riesenberg, "Handbuch der Mikroskopic" (Handbook of Microscopy), Berlin, 1988, chapter 6.2.

With a microscope of the Linnik-type (as it is shown in FIG. 1), a light beam is divided by means of a beam divider into an object beam and a reference beam, whereby the object beam is reflected in this case by the object, and the reference beam is reflected by a reference mirror. Subsequently both beams are interferingly supplied to the detector. The reference mirror is movable in the direction of the reference beam.

For the application of the aforementioned four-step method or the so-called four-bucket method, the reference mirror is moved with respect to its original position across each of the distances $\frac{1}{4}\lambda$, $-\frac{1}{8}\lambda$, and $\frac{1}{8}\lambda$, whereby $\lambda$ is the wavelength of the light used from the light source. From this, the following four images are obtained:

$$I_1=a^2(1+\mu\cos\phi) \quad (3)$$

$$I_2=a^2(1-\mu\cos\phi)$$

$$I_3=a^2(1-\mu\sin\phi)$$

$$I_4=a^2(1+\mu\sin\phi).$$

The pixel coordinates were omitted for said four equations for reasons of convenience.

The equations (3) show that the following is applicable to each pixel:

$$\tan\phi=\frac{I_4-I_3}{I_1-I_2}. \quad (4)$$

Of course, $\phi$ is obtained between $-\pi/2$ and $+\pi/2$. A development method would be required for greater values. The specified algorithms are available in commercially available software. However, all phase-measurement algorithms as described in the cited paper by Creath suffer from the addressed problem of limitation for the value of $\phi$, in any case up to a certain degree.

The aforementioned four-bucket algorithm has an advantage and a drawback as compared to other algorithms as described in the paper cited above. The advantage consists in that said algorithm is relatively insensitive to detector non-linearities. The drawback consists in that the algorithm is relatively sensitive to errors in the /2-phase steps and thus with respect to the positioning of the reference mirror. This makes the commonly used digital interferometer systems less suitable for the desired high resolution (super-resolution). In practical application, they achieve an accuracy of (only) up to $\lambda/100$, and this only under particularly favorable circumstances, whereas an accuracy of $\lambda/1000$ is desired or required for refined experiments of super-resolution. The aforementioned four-bucket algorithm is nevertheless the best candidate for improving the accuracy in view of the desired accuracy.

SUMMARY OF THE INVENTION

The invention is based on the problem of proposing a method and an interference microscope in connection with which the spatial and the phase resolution of an interference microscope are optimized in view of super-resolution.

In terms of method, said problem is solved according to the invention in that by means of a zooming device with adjustable enlargement, said device being connected upstream of the interference figure detector, an enlargement (V) is adjusted by which the location uncertainty ($\Delta x$) to be determined is associated with a part zone of the detector screen, if need be with a part area of an image zone, by adjusting the enlargement (V) in dependence of the phase steepness ($\delta\phi/\delta x$) of the phase ($\phi$) in the phase image, and of the signal-to-noise ratio (SNR), for which purpose a feedback of the image information from the phase image is used for the zoom adjustment.

The spatial resolution is controlled by the aforementioned features of the solution in connection with a method of the type specified above, whereby, however, the phase resolution and the spatial (lateral) resolution are coupled with each other via the detection of the gradients or edges in the phase image, i.e., no coupling at all is present when the phase is constant.

Accordingly, the phase resolution ($\Delta\phi$) and the accuracy of the location determination of the margins, edges or are connected with each other via $$\Delta\phi=\Delta x \delta\phi/\delta x). \tag{5}$$

Here, $\delta\phi/\delta x$ is a quantity that could be called the steepness of the edge.

The equations (3) and (4) show that the phase uncertainty is directly proportional to the detector noise, so that $$\Delta\phi=1/SNR_D. \tag{6}$$

In the above equation, $SNR_D$ symbolizes the signal-to-noise ratio of the detector. It has to be taken into account in this connection that the coherent noise, which is conditioned by scatter in the instrument, has the same effect. Therefore, said two sources of noise can be combined in the following.

Equation (5) shows that $\Delta x$ can be determined when the detector noise and the marginal steepness in the image field are known, whereby it is possible under certain circumstances to use for the determination of $\Delta x$ a local or a determined marginal steepness.

According to the invention, the spatial (lateral) resolution is optimized by enlarging the image in such a way that the location uncertainty $\Delta x$ becomes equal to the quantity pdp, whereby dp of the size of a detector pixel, and p is a pixel interpolation factor smaller than 1 (in practical application, for example p=0.1). For this purpose, the interference microscope according to the invention is provided with a separate zoom-enlargement system, which is adjustable. Specifically, such adjustment is controlled by information about the marginal steepness, which is obtained from the phase image.

The zoom enlargement is given by $$V=pdp/x=pdp\cdot\delta\phi/\delta x\cdot SNR. \tag{7}$$

In said equation (7), the values pdp and SNR can be viewed as being given. The product thereof can be determined empirically. In practical application, dp could be inserted as 12 $\mu$m, p with 0.2, and SNR as 512.

According to the invention, taking into account equation (7), first the marginal steepness is calculated in this way based on a phase image, whereupon a signal can be generated by means of an amplifier, which signal, taking into account the other given values, is proportional to the enlargement V. With such signal, it is possible to control a zoom motor. Therefore, according to the invention, based on the information received from the phase image, an optimal enlargement is determined via a feedback branch, such optimal enlargement being adjusted with the zoom-system, and on the other hand, the results are enhanced thereby, and the detector device is optimally exploited.

According to a next further development of the method of the invention, provision is made that for testing or measuring a location with a phase singularity in the interference figure, a maximal enlargement ($V_S$) is selected that is proportional to the detector noise (SNR) and inversely proportional to a light beam width parameter (b).

Phase singularities can be present, for example in connection with laser modes of a higher order, where line singularities occur. Degenerated superpositions of such modes may lead to point singularities. Furthermore, singularities may occur in connection with interference patterns with interference of two beams with Gaussian distribution. Singularities also can occur with spotted patterns of fields, which are scattered by rough surfaces and observed with the help of an aperture. Furthermore, singularities may occur when fields are scattered on discontinuities of surfaces.

Based on equation (7), one arrives in the presence of singularities at a maximal enlargement factor $V_S$ because in the presence of singularities, a maximum steepness occurs in the phase distribution in the plane of the image. Particularly in case of line singularities, the latter can be defined as contours of a zero amplitude having opposed phases on its two sides of the wave. Thus the phase, when transgressing a singularity, makes a jump of $\pi$. The steepness of the phase gradient is infinite in such a spot.

If such a singularity is to be tested with the help of the four-bucket algorithm, the field in the neighborhood of the singularity is, with x=0, given by $$E=x/b, \tag{8}$$

whereby b is a suitable beam width parameter (such a singularity can be produced, for example by interference of two Gauss beams with different beam centers. In this case, b is the beam width of the original Gauss beam). Interference with a reference field $E_R=e^{i\phi}$ results in:

$$I_1 = 1 + \frac{x^2}{b^2} + 2\frac{x}{b}\cos\varphi. \tag{9}$$

The following is obtained with the four-bucket algorithm:

$$\frac{I_3 - I_4}{I_1 - I_2} = \frac{4\frac{x}{b}\sin\varphi}{4\frac{x}{b}\cos\varphi} \tag{10}$$

The above shows that the factor 4 x/b shortens itself out, so that the same tangent-value tan $\phi$ is obtained on both sides of the singularity. This is not surprising because tan $\phi$ is identical with the period $\pi$. In the location x=0, the break on the right side of the equation (10) is undefined.

Noise terms would have to be added to $T_1$–$I_4$ in order to obtain a physical meaning. The singularity is viewed only as a fluctuation in an otherwise smooth phase profile.

The contour or the singularity can be obtained as location of a normal zero amplitude from:

$$I_1 - I_2 = 4\frac{x}{b}\cos\varphi \qquad (11)$$

$$I_3 - I_4 = 4\frac{x}{b}\sin\varphi$$

After adding noise terms, it follows from said equations that the accuracy of the localization of the singularity contours is given by:

$$\frac{\delta x}{b} = \frac{1}{SNR}. \qquad (12)$$

From the above follows that the maximum value of the zoom enlargement factor V is given by:

$$V_S = \frac{pdp}{b} \cdot SNR. \qquad (13)$$

This corresponds with a value of $\delta\varphi/\delta x$ equal to $1/b$.

V. P. Tychinsky already reported on experimental and theoretical work on the detection and localization of singularities in the images of phase objects, published, for example in Opt. coom. 80, pages 1 to 7 (1991), and 74, pages 41 to 45 (1989).

The enlargement of the microscope of Tychinsky is selected in such a way that $V_S \cdot b$ is equal to the size of the detector. In this case, the value $V_S \cdot b$ divided by pdp is in the order of magnitude of the number of pixels in one line. With Tychinsky, the resolution is limited by the number of pixels. This, however, is an unnecessary limitation. $V_S \cdot b$ also can be selected larger than the detector. According to Tychinsky, the resolution is proportional to $1/\sqrt{SNR}$. It was shown in the present application in (12) that coherent detection leads to a proportionality of the resolution to $1/SNR$.

A next further development of the method according to the invention, for which independent protection is claimed as well, is characterized in that the position of a reference object present, if any, such position being required for a measurement, is on its part adjusted with the help of an interference measurement:

It has been explained earlier herein that the so-called four-bucket algorithm is relatively sensitive to errors in the adjustment of the reference object, particularly of the reference mirror, mainly also in connection with the step-by-step adjustment of the reference mirror, as it is explained between the equations (2) and (3).

So that such position sensitivity of the method will not be at the expense of accuracy, it is proposed according to the invention to adjust or test the respective position of a reference object on its part with the help of an interference measurement. In order to avoid that even a second independent interference system has to be integrated in a complicated interference system, it is proposed according to a further development that for adjusting the position of a reference object—such position being required for a measurement—through a feedback between the reference object between A detector, which may be identical with the interference figure detector, and the reference object, or a system for moving the reference object, the information of at least one predetected image is used. In this connection, it is possible to use the interference figure detector itself; a certain range of the detector can be used; or it is possible to use a separate, simpler detector, because the testing measurements have to be carried out as quickly as possible.

The axial position control of the reference object is carried out in the simplest way by modulating or changing the position of the reference object by means of admitting a harmonic oscillation acting on said object. In this connection, a modulation oscillation of a defined frequency $\omega$ is used, for example of 1000 Hertz. In connection with a particularly elegant and preferred execution of the method, the object for positioning the reference object with respect to the interference measurement to be carried out for such purpose is, on its part, used as the reference object.

With respect to the procedures and advantages of the axial position control of the reference object, the following is explained in detail;

It is proposed that the accuracy of the phase measurement is controlled by finely and strictly controlling the $\pi/2$-phase steps that are carried out for the four-bucket algorithm. One possibility for achieving this would be to measure said phase steps by means of a separate interferometer, which is inserted in the reference beam of the microscope. This is obviously feasible; however, it would require additional complexity of the system used. Furthermore, it would then not be possible to detect and compensate relative changes that might possibly occur in the position between the object and the reference object, for example changes caused by vibrations.

Therefore, the preference of the proposal is to use the object itself as the reference mirror for measuring the position of the reference mirror. In this way, the position of the reference mirror relative to the object is determined with special accuracy as well. Furthermore, this method permits the best exploitation of the available functions of the system. A separate detector could be used for the control measurement. However, it is possible also to determine an interference signal by averaging via a substantial part of the interference figure detector. Said signal can be described as follows;

$$\bar{I} = \bar{a}^2(1 + \bar{\mu}\cos\bar{\varphi}). \qquad (14)$$

In the above equation, the averaged phase is given by:

$$\tan\bar{\varphi} = \frac{\langle\sin\varphi\rangle}{\langle\cos\varphi\rangle}, \qquad (15)$$

whereby the brackets denote an integration via the used part of the interference figure detector. The modulation depth $\mu$ is approximately supplied by:

$$\bar{\mu} = 1 - D(\varphi). \qquad (16)$$

Herein, $D(\varphi)$ is the variance of the phase of the object. If the reference mirror is displaced across a distance $$\left(\varphi_o \cdot \frac{\lambda}{2\pi}\right),$$

the integrated signal becomes:

$$\bar{I} = \bar{a}^2(1 + \bar{\mu}\cos(\bar{\varphi} - \varphi_o)). \qquad (17)$$

The position of the reference mirror at the which the value $(\bar{\varphi} - \varphi_o)$ is equal to $-\pi/2, 0, \pi/2, \pi$ is to be determined.

For such determination, the position of the reference mirror is modulated with a harmonic frequency $\omega$, namely with a small amplitudes, typically in the order of magnitude of $\lambda/100$, so that an integrated signal $$\bar{I}(t) = \bar{a}^2(1 + \bar{\mu}\cos(\bar{\varphi} - \varphi_o + \Delta\varphi\cos\omega t)) \qquad (18)$$

is obtained. If $\bar{\varphi} - \varphi_o = 0$, the intensity $\bar{I}(t)$ has frequency components at $\omega$ and $2\omega$ with the standardized amplitude 0 and −1. At $\bar{\phi}-\phi_o=\pi$, said standardized amplitudes amount to 1 and 0, and at $\bar{\phi}-\phi_o=-\pi/2$, the amplitudes come to −1 and 0. Thus it is possible to develop a feedback loop in order to adjust the positions so characterized with very high accuracy. The modulation depth $\bar{u}$ determines the stiffness of the control loop. Equation (16) shows that the same is high if the variance $D(\phi)$ is small. We then have a relatively smooth object. A small modulation depth is obtained with a rough object. This is good because precise phase measurement is of interest particularly in connection with objects with small phase changes.

The simulations contained in the paper by Creath cited above show that an accuracy of 1% of the phase step is sufficient in order to carry out the four-bucket algorithm with an accuracy of λ/1000. With a modulation amplitude of 10 mrad, this requires a noise (SNR) of 30 dB (10 bit-suppression) of the integrated signal. This seems realistic if one integrates across a substantial part of the CCD-line, or if a separate diode is used in order to generate the integrated signal. The latter would allow carrying out much more rapid phase steps than the former. For example, if a piezo-ceramic activator is used, a frequency modulation of 1000 Hertz could be carried out at small amplitudes.

A preferred type of illumination in microscoping, for which independent protection is claimed as well, is contained in claim 7.

In terms of device, the problem posed is solved according to the invention by an advanced interference microscope, which is characterized by a feedback branch between a detector, which can be identical with the interference figure detector, and the device for actuating a reference object illuminated by one of the part beams. With the advantages already described herein in connection with the method, it is achieved in this way that the information from the phase image can be used in order to precisely adjust, for example a reference mirror, and that a more precise measurement can be obtained in view of the four-bucket algorithm. Such preadjustment can be carried out, for example with a certain range of the interference figure detector, or with a separate, more rapid additional detector.

According to a further development of the invention, the interference microscope is characterized in that the actuating device for the reference object comprises an oscillator for the oscillating motion of the reference object with a defined frequency, an input for the respective detector signals, and a comparator for comparing the signals of the input at different frequency components of the integrated intensity signal $\bar{I}(t)$ and for controlling the adjustment and for positioning the reference object in dependency of the result of the comparison. In this respect too, the procedure and the have been discussed herein in the foregoing in connection with the method according to the invention.

A next further development of the interference microscope according to the invention, for which independent protection is claimed as well, is characterized by a zooming system with the adjustable enlargement V, such system being connected upstream of the interference figure detector, and by a feedback branch for adjusting the enlargement V of the zooming system in dependence of the conditions of the object to be measured in the given case.

Particularly also the enlargement with the help of a zooming system is thus advantageously adjusted by means of a feedback branch in that also for adjusting an optimal enlargement, the required information is obtained from the phase image, in a way such that, for example, even within a pixel of a CCD-line, it is possible to interpolate and to exploit the detector in this way in a particularly good way.

For this purpose, the interference microscope comprises preferably in the feedback branch an image-processing system for processing the interference figure of the interference figure detector, and a control electronics for controlling the adjusting system as required.

According to another further development, the interference is characterized in that the control electronics has an input for a signal computed in the image-processing unit, such signal being dependent upon the steepness of the measured phase within a location range Δx that is of interest, and comprises an amplifier, which transmits a control signal for adjusting the enlargement V, such control signal being proportional thereto. The enlargement V becomes maximal with the observation of singularities because the steepness there become infinite.

Another further development of the interference microscope, which relates to a preferred illumination, for which independent protection is claimed as well, is contained in claim 13 and is explained in greater detail at the end of the description of the figures in connection with FIG. 5.

BRIEF DESCRIPTION OF THE DRAWINGS

FIG. 3 shows an interference microscope of the type according to FIG. 1 with a feedback loop for adjusting and controlling the enlargement;

FIG. 4 shows a block circuit diagram for the feedback branch according to FIG. 3.

DETAILED DESCRIPTION OF THE PREFERRED EMBODIMENT

Figure 1:
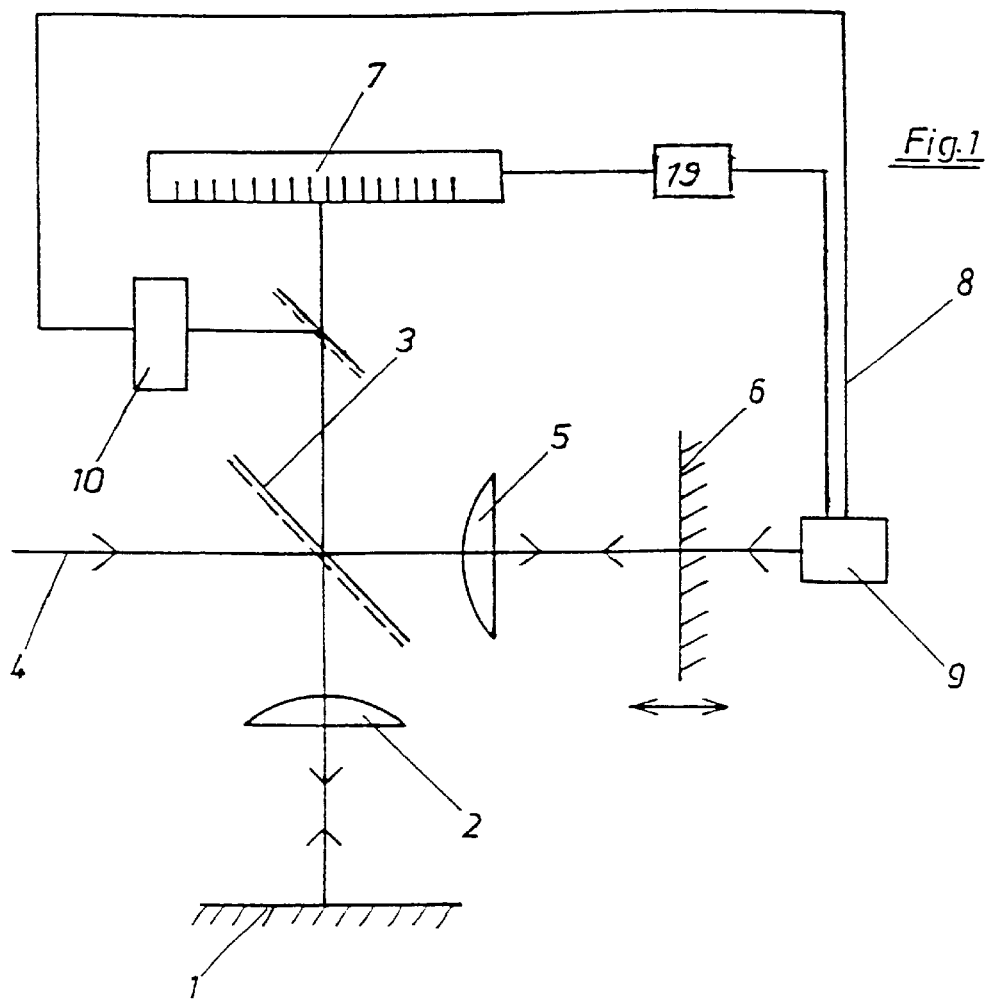
FIG. 1 shows a schematic top view of an interference microscope of the Linnik-type according to the invention.

FIG. 1 shows a first exemplified embodiment of an interference microscope of the Linnik-type according to the invention. The system comprises an object 1 which, in the shown case, reflects; a lens 2, a beam divider 3, which is designed in the form of a semi-transparent mirror; an illumination beam 4 emitted from a light source; a reference lens 5 having the same design as the lens 2; and a reference mirror 6, which is axially movable relative to the light beam in the direction shown by the double arrow. Furthermore, the reference mirror 6 may be tiltable or rotatable also around two axes. In addition, the system comprises as the interference figure detector a CCD-line 7, whose images are converted into phase images by an image processor 19.

The illumination beam 4 impact the beam divider 3 and is divided by the latter into an objective beam and a reference The objective mean impacts through the lens 2 the object 1 to be examined, and is reflected by the latter, whereas the reference beam impacts through the reference lens 5 the reference mirror 6 and is reflected by the latter. Within the range of the beam divider 3, the two part beams are combined again and transmitted onto the CCD-line 7, in which an interference figure of the two part beams is measured. First, the intensity pattern of the intensity I is measured. However, in particular a phase information is to be obtained about the phase from which information can be gained that finally leads to super-resolution of the interference microscope beyond the diffraction limit, namely in accordance with the equations (1) to (4). For this purpose, the reference mirror 6 has to be changed in its positions step by step, namely by steps conforming to fractions of the wavelength. Also the accuracy of the actual interference measurement finally depends on the accuracy of the adjustment of said mirror positions. Therefore, in connection with the interference microscope shown in FIG. 1, the adjustment of the exact mirror position of the reference mirror 6 is controlled or adjusted by means of a feedback branch 8, namely by a controller 9. For the feedback branch, the information can be picked up from the CCD-line 7 used as the interference figure detector however, it is possible also to make provision for a simple additional detector 10, as this is shown by way of example in FIG. 1. For said detector 10, the interference beam is branched off the path of light.

For controlling the position adjustment of the reference mirror 6, the latter is substantially put into vibrations, i.e. into local vibrations, with a harmonic oscillation. Following the equations (14) to (18), the information desired for the position adjustment of reference mirror 6 can be picked up therefrom.

Figure 2:
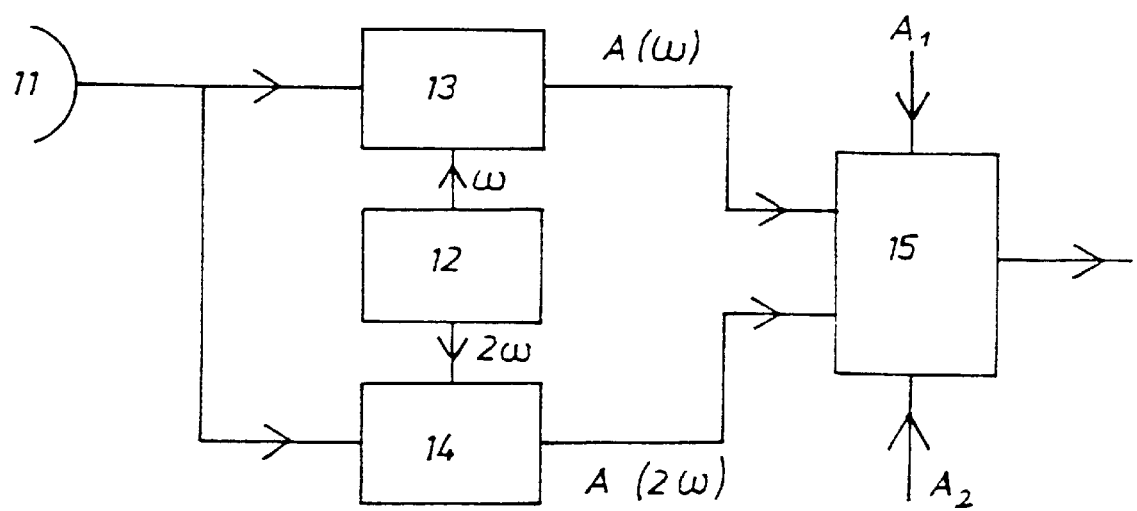
FIG. 2 shows a feedback loop in the block circuit diagram for controlling the position of the reference mirror.

FIG. 2 shows in greater detail the controller 9 according to FIG. 1 by a block circuit diagram.

The controller 9 has an input 11, through which the intensity signal from the detector 10 or from an integrated zone of the detector 7 enters. Furthermore, the controller 9 comprises an oscillator 12, which drives the reference mirror 6 with a modulation frequency ωand generates the comparative frequencies ω, 2ω, and mixes the latter in the heterodyne amplifiers 13 and, respectively, 14 with the input signal. The (band-filtered) output signals A (ω) and A (2ω) of 13 and 14 are compared in a comparator circuit 15 with the reference signals $A_1$ and $A_2$ generated by the image processor 19. Based on the results of the comparison, the reference mirror 6 is then exactly adjusted to the desired position accordingly by the output signal of the comparator 15.

FIG. 3 shows an exemplified embodiment of an interference microscope of the type according to FIG. 1. Preferably in addition to the feedback branch 8, which is omitted in FIG. 3 for the sake of better clarity, the interference microscope shown in FIG. 3 has a feedback branch 16 which, as the enlargement system for adjusting an enlargement V, comprises a zooming system 17, as well as the control electronics 18 and an image processor 19. Components identical with those in FIG. 1 are denoted by the same reference numerals.

With the feedback branch 16, an enlargement V is optimally or maximally adjusted via the zooming system 17 and in dependance of the interference figure obtained in the CCD-line 7 in a way such that, with a certain interpolation within the pixels of the CCD-line, superior exploitation of the latter and thereby optimal resolution are possible.

The control electronics 18 is shown in greater detail in FIG. 4 in a block circuit diagram.

From the image processor 19, an input signal 20 is first received in an amplifier 21, which transmits a signal proportional to the enlargement V to a comparator 22, which deducts one enlargement step from the enlargement. The output signal of said comparator is transmitted to an energy amplifier 23, which controls a motor 24, the latter serving for adjusting the zoom of the zooming system 17 as required.

Figure 5:
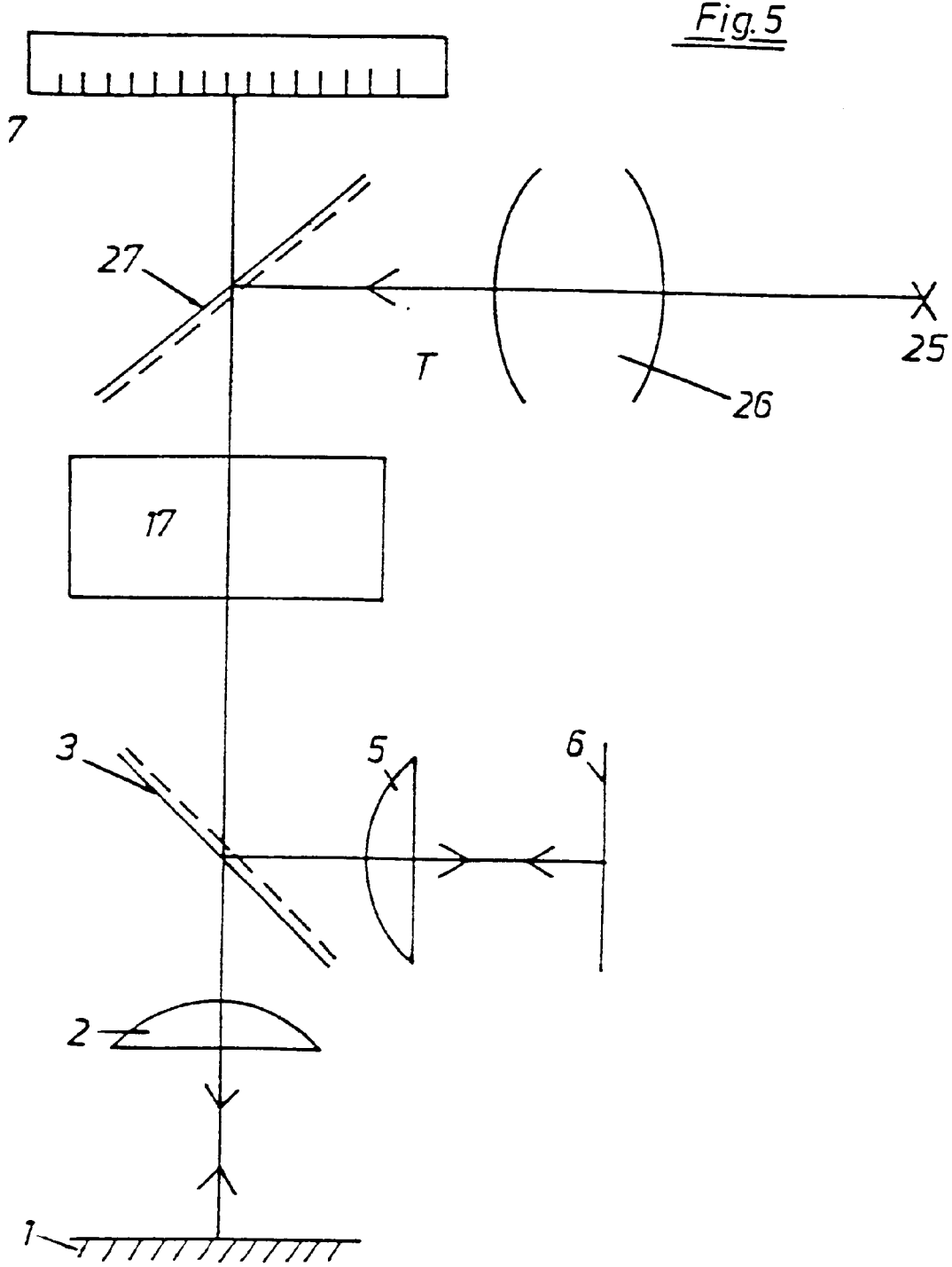
FIG. 5 shows a modification of the interference microscope according to FIG. 3 with a changed illumination arrangement

FIG. 5 shows another exemplified embodiment of an interference microscope according to the invention. Again, components identical with those in FIG. 1 are denoted by the same reference numerals.

In addition, said interference microscope has a zooming system 17.

The special feature of said interference microscope is that a light source 25 is arranged in such a way that the illuminating beam is admitted via the optics 26 and a deflecting mirror 27 into the beam path in a way such that already the illuminating beam as well as also the returning interference beam pass through the zooming system 17, in a way from the one shown in accordance with FIG. 3.

It is basically possible to use a wide-band light source for the interference microscopy like a monochromatic light source. However, it is necessary to assure that the difference of the optical path length between the object wave and the reference wave is kept smaller than the coherence length of the light source. In this connection, the illuminated part of the objective has to be adapted to the size of the detector and the enlargement. This requires controlling of the enlargement in the illumination branch. With the device according to FIG. 5, in which the illuminating beam is transmitted through the zooming system 17, this requirement can be satisfied in a simple way without any further requirements.

When using a light source with a limited coherence length, an advantage lies in the fact that light scattered in the instrument can be viewed as being incoherent with the object wave and the reference wave. This results in a constant underground intensity in the detector, which is suppressed by the use of the four-bucket algorithm. In the cited work by Tychinsky, the object is illuminated with a focused laser beam. The image of said beam covers the detector. In this case, focused illumination is necessary, but in other situations, the difference is that the illumination pattern has to be adapted to the field of vision. The device according to FIG. 5 (automatically) realizes such adaptation.

What is claimed is:

1. A method for microscoping an object with an interference microscope with extremely high resolution comprising the steps of:

a) projecting a light beam through a lens;

b) dividing the light beam by a beam divider into two coherent beams wherein at least one beam lights the object and the second beam lights a reference object;

c) combining said two beams into one beam through interference;

d) producing at least one interference figure from a combination of said two beams;

e) sending said interference figure to an interference figure detector;

f) sending said interference figure from said interference figure detector to an image processor; and g) converting said interference figure into a phase image in said image processor;

h) obtaining a resolution of said phase image beyond a diffraction limit through a zooming system defined by the relationship:

$$V=pdp/x=pdp*(\delta\phi/\delta x)*SNR$$

wherein spacial and lateral resolution is optimized by enlarging the phase image so that a location uncertainty (Δx) becomes equal to the quantity pdp by calculating a phase image by means of an algorithm, wherein an image enlargement (V) is adjusted in dependence on a phase steepness (δφ/δx) of a phase (φ) in the phase image, and on a signal-to-noise ratio (SNR) while dp is defined as the size of the detector pixel and p is the pixel interpolation factor smaller than one for which a feedback of image information from the phase image is used for a zoom adjustment.

2. The method according to claim 1, wherein step f includes calculating a maximal enlargement (Vs) wherein said enlargement is proportional to the detector noise (SNR) and inversely proportional to a light beam width parameter.

3. The method according to claim 1, further comprising the step of changing the position of the reference object from a first position to a second position based on an interference measurement to obtain a measurement by a feedback between a detector.

4. The method according to claim 3, wherein the movement of the reference object from a first position to a second position involves using the information of at least one previously detected image to adjust the position of the reference object required to receive feedback between the interference figure detector and the reference object or a direction of motion of the reference object.

5. The method according to claim 4, wherein said reference object is moved from the first position to the second position through harmonic oscillation of a frequency ($\omega$) to obtain more precise information about the positioning of the reference object based on the change in the phase between the phase ($\phi°$) at said first position, and the phase ($\phi+\Delta\phi\cos\omega t$) at said second position.

6. The method according to claim 5, wherein to determine the position or adjustment of the reference object, the frequency components of the integrated intensity I(t) are used at the modulation frequency ($\omega$) and the double frequency ($2\omega$).

7. The method according to claim 1, further comprising the steps of lighting said object before the light beam is split into the object beam and the reference beam, and reproducing the interference figure of the interfering beams on the interference figure detector after their combination.

8. An interference microscope for illuminating an object comprising:

a light source for transmitting a light beam;

a beam divider for dividing the light beam transmitted by said light source into at least two coherent part beams wherein at least one beam is intended to light the object;

a reference object illuminated by one of said at least two coherent part beams;

an interference figure detector, for receiving said at least two coherent part beams and generating an interference figure from the interfering part beams;

a feedback branch connected to said interference figure detector for transmitting said interference figure;

an image processor connected to said feedback branch for receiving said interference figure and processing said interference figure into a final phase image; and an actuating system designed to adjust a position of said reference object to obtain a resolution for said phase image past a diffraction gradient through a zooming system defined by the relationship:

$$V = pdp/x = pdp*(\delta\phi/\delta x)*SNR$$

wherein spacial and lateral resolution is optimized by enlarging the phase image so that a location uncertainty $\Delta x$ becomes equal to the quantity pdp by calculating a phase image by means of an algorithm, wherein an image enlargement (V) is adjusted in dependance on a phase steepness ($\delta\phi/\delta x$) of a phase ($\phi$) in the phase image, and on a signal-to-noise ratio (SNR) while dp is defined as the size of the detector pixel and p is the pixel interpolation factor smaller than one for which a feedback of image information from the phase image is used for a zoom adjustment.

9. An interference microscope according to claim 8, wherein said actuating system comprises an oscillator for the oscillating motion of a reference object at a defined frequency ($\omega$), an input for the detector signals; and a comparator for comparing the signals of the input at different frequency components of the integrated intensity signal I(t) and for controlling the adjustment and positioning of the reference object in dependence on the result of the comparison.

10. An interference microscope as claimed in claim 8, further comprising a zooming system having an adjustable enlargement, said system being connected upstream of the interference detector and connected by a feedback branch between the interference figure detector, and an adjusting device for adjusting the enlargement of the zooming system in dependence on the measuring conditions in the object to be measured in the given case.

11. An interference microscope according to claim 10, wherein the feedback branch has an image-processing device for processing the interference figure of the interference figure detector, and a control electronics for controlling the adjusting device motor.

12. An interference microscope according to claim 11, wherein said control electronics has an input for a signal computed in the image-processing device, said signal being dependant upon the steepness of the measured phase of the interference figure within a local range of the object that is of interest, and comprises an amplifier transmitting a control signal proportional thereto for adjusting the enlargement.

13. The interference microscope according to claim 8, further comprising a light beam feeding device positioned in the microscope to light the object before its beam is split into two separate beams.

* * * * *